US006725360B1

(12) United States Patent
Aldrich et al.

(10) Patent No.: US 6,725,360 B1
(45) Date of Patent: Apr. 20, 2004

(54) SELECTIVELY PROCESSING DIFFERENT SIZE DATA IN MULTIPLIER AND ALU PATHS IN PARALLEL

(75) Inventors: Bradley C. Aldrich, Austin, TX (US); Jose Fridman, Brookline, MA (US); Paul Meyer, Chandler, AZ (US); Gang Liang, Acton, MA (US)

(73) Assignees: Intel Corporation, Santa Clara, CA (US); Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/541,116

(22) Filed: Mar. 31, 2000

(51) Int. Cl.[7] ................................................ G06F 9/302
(52) U.S. Cl. ...................... 712/221; 708/518; 708/524; 712/35
(58) Field of Search .............................. 708/518, 524, 708/603; 712/15, 210, 35, 221

(56) References Cited

U.S. PATENT DOCUMENTS

| | | | | |
|---|---|---|---|---|
| 4,748,585 A | * | 5/1988 | Chiarulli et al. ............... | 712/15 |
| 5,432,728 A | | 7/1995 | Curtet | |
| 5,517,436 A | | 5/1996 | Andreas et al. | |
| 5,666,169 A | * | 9/1997 | Ohki et al. .................. | 348/721 |
| 5,933,797 A | | 8/1999 | Håakansson et al. | |
| 6,092,094 A | * | 7/2000 | Ireton .......................... | 708/706 |
| 6,370,630 B1 | * | 4/2002 | Mizuyabu et al. .......... | 711/167 |
| 6,418,527 B1 | * | 7/2002 | Rozenshein et al. ........ | 712/208 |

FOREIGN PATENT DOCUMENTS

| | | | |
|---|---|---|---|
| EP | 0 654 733 | | 5/1995 |
| WO | WO 98/32071 | | 7/1998 |
| WO | WO 99/31601 | | 6/1999 |

OTHER PUBLICATIONS

Bermak, et al., "High–density 16/8/4–bit configurable multiplier", *IEE Proc.–Circuits Devices Syst.*, 144(5):272–276, (1997).

Kim, et al., "4–way Superscalar DSP Processor for Audio Codec Applications", Proceedings of the 1998 IEEE International Conference on Acoustics, Speech and Signal Processing, ICASSP, '98, Seattle, Wa, USA, May 12–15, 1998, IEEE International Conference on Acoustics, Speech and Signal Processing, New York, NY, vol. 5, Conf. 23, May 12, 1998, pp. 3117–3120.

Singh, et al., "GaAs Low–Power Integrated Circuits for a High–Speed Digital Signal Processor", *IEEE Transactions on Electron Devices*, 36(2):240–249, (1989),.

Singh, et al., "GaAs Low–Power Integrated Circuits for a High–Speed Digital Signal Processor", *IEEE Transactions on Electron Devices*, vol. 36, No. 2, pp. 240–249, Feb., 1989.

* cited by examiner

*Primary Examiner*—Kenneth S. Kim
(74) *Attorney, Agent, or Firm*—Fish & Richardson P.C.

(57) ABSTRACT

An integrated circuit which has two separate paths for two different data widths. The first processing path processes data up to n bits in a n multiplier. A second path operates in parallel with the first path, and includes smaller units which process data up to n 2 bits. The two paths can operate in parallel, but since the two paths have different data widths, they can more effectively operate with the different data sizes.

10 Claims, 5 Drawing Sheets

SELECTIVELY PROCESSING DIFFERENT SIZE DATA IN MULTIPLIER AND ALU PATHS IN PARALLEL

TECHNICAL FIELD

This invention relates to digital signal processors, and more particularly to digital signal processors for processing reduced data sizes.

BACKGROUND

Digital signal processing is concerned with the representation of signals in digital form and the transformation or processing of such signal representation using numerical computation. Digital signal processing is a core technology for many of today's high technology products in fields such as wireless communications, networking, and multimedia. One reason for the prevalence of digital signal processing technology has been the development of low cost, powerful digital signal processors (DSPs) that provide is engineers the reliable computing capability to implement these products cheaply and efficiently. Since the development of the first DSPs in the early 1980's, DSP architecture and design have evolved to the point where even sophisticated real-time processing of video-rate sequences can be performed.

Typically, DSPs are constructed of a fixed size. The size of a DSP is selected based on the maximum size of the data to be processed. For example, a DSP that will be used to process 16 bit data needs multipliers and accumulators of a specific size to ensure that the data is processed correctly.

While these DSPs can process data having less than 16 bits, doing so causes a portion of the DSP hardware to remain unused. This decreases the efficiency of the DSP.

DESCRIPTION OF DRAWINGS

These and other features and advantages of the invention will become more apparent upon reading the following detailed description and upon reference to the accompanying drawings.

DETAILED DESCRIPTION

Figure 1:
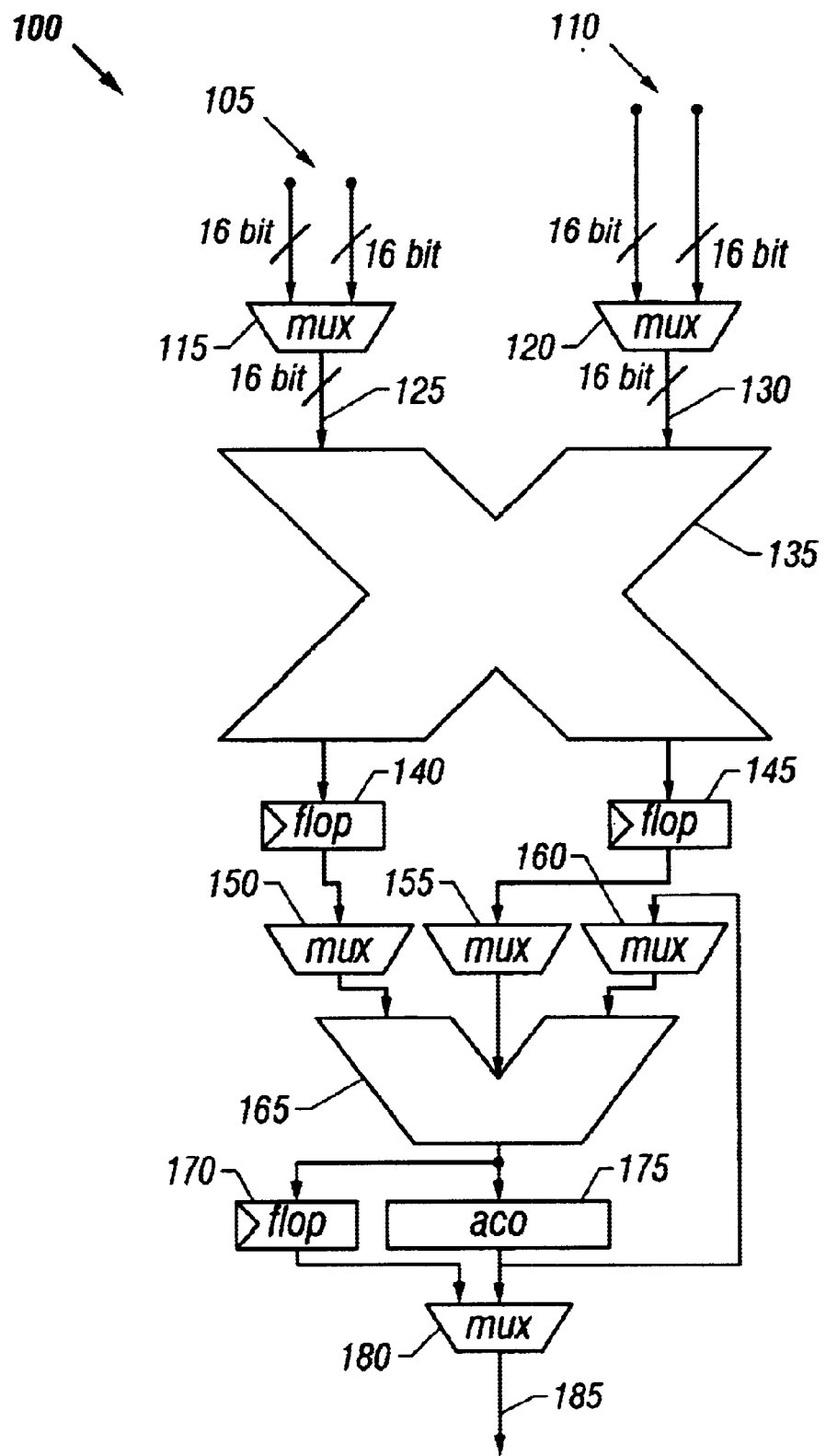
FIG. 1 is a schematic of a digital signal processor used for general n-bit modes of operation in accordance with an embodiment of the present invention.

A general purpose digital signal processor (DSP) 100 is illustrated schematically in FIG. 1. The DSP 100 includes multiplexers 115, 120, 150, 155, 160, a multiplier 135, flops 140, 145, 170, an arithmetic logic unit (ALU) 165, and an accumulator 175. The DSP 100 is designed for processing n-bit data, with n equal to 16 for the exemplary DSP 100 illustrated in FIG. 1. It can be appreciated that the size of the data for which the DSP 100 operates is a matter of design choice. In addition, it should be understood that the scope of the present invention is not limited to DSPs with these elements.

The DSP 100 receives data in the form of 16-bit data 105, 110 from data buses. Each data bus provides a plurality of 16-bit data sets 105, 110 to the DSP 100. The plurality of 16-bit data sets 105 is input into the multiplexer 115 and the plurality of 16-bit data sets is input into the multiplexer 120. The multiplexer 115 selects a single 16-bit data set 125 from the plurality of 16-bit data sets 105. The multiplexer 120 selects a single 16-bit data set 130 from the plurality of 16-bit data sets 110. The selected 16-bit data sets 125, 130 are processed by the DSP 100.

The multiplier 135 receives the selected 16-bit data sets 125, 130 from the multiplexers 115, 120. The multiplier 135 may be configured to multiply two n-bit data sets. To ensure proper operation, the multiplier 135 may be at least 2n bits in size. In the present exemplary embodiment, the multiplier 135 may be at least 32 bits in size to allow multiplication of two 16-bit numbers. Of course, the multiplier 135 may multiply two numbers of any size up to and including 16-bit numbers. However, if the multiplier 135 multiplies numbers smaller than 16 bits, a portion of the multiplier 135 may remain unused. Because of the unused portion of the multiplier 135, the DSP 100 may not be operating at desired efficiency.

In this embodiment, the result of the multiplication operation is transferred to the flops 140, 145. The flops 140, 145 are memory elements that utilize electronic latching circuits. The flops 140, 145 contain partial products from the multiplication process. The combination of the partial products in the flops 140, 145 equals the result of the multipliers 135. The flops 140, 145 pass the partial products to the multiplexers 150, 155. The multiplexers 150, 155, and 160 select the appropriate data to pass to the ALU 165. The multiplexer 160 receives as an input the value of the accumulator 175. If the result of the multiplier 135 alone is desired, the multiplexer 160 would not pass the data to the ALU 165. The ALU 165 performs basic arithmetic and logical operations. In one embodiment, the ALU 165 is constructed of full adders. Full adders add three bits at a time, and produce results in the form of a sum and a carry. The ALU 165 takes the result from the multiplier 135 and adds that result to the previous value of the accumulator 175 stored in the multiplexer 160.

The output of the ALU 165 may be provided to a flop 170 and to the accumulator 175. The flop 170 has the result of the last value of the ALU 165. The accumulator 175 value represents a total of all of the previous results from the ALU 165. The most recent output of the ALU 165 is added to the accumulator 175, and the new accumulator value is then provided in a feedback loop to the multiplexer 160 for possible inclusion in the next ALU 165 operation. The new accumulator value is also provided as an input to the multiplexer 180. The value of the flop 170 may also provided as an input to the multiplexer 180. The multiplexer 180 allows the DSP 100 to choose whether to output the value of the accumulator 175 or the most recent result from the ALU 165. Once selected, this data is sent to an output 185.

Figure 2:
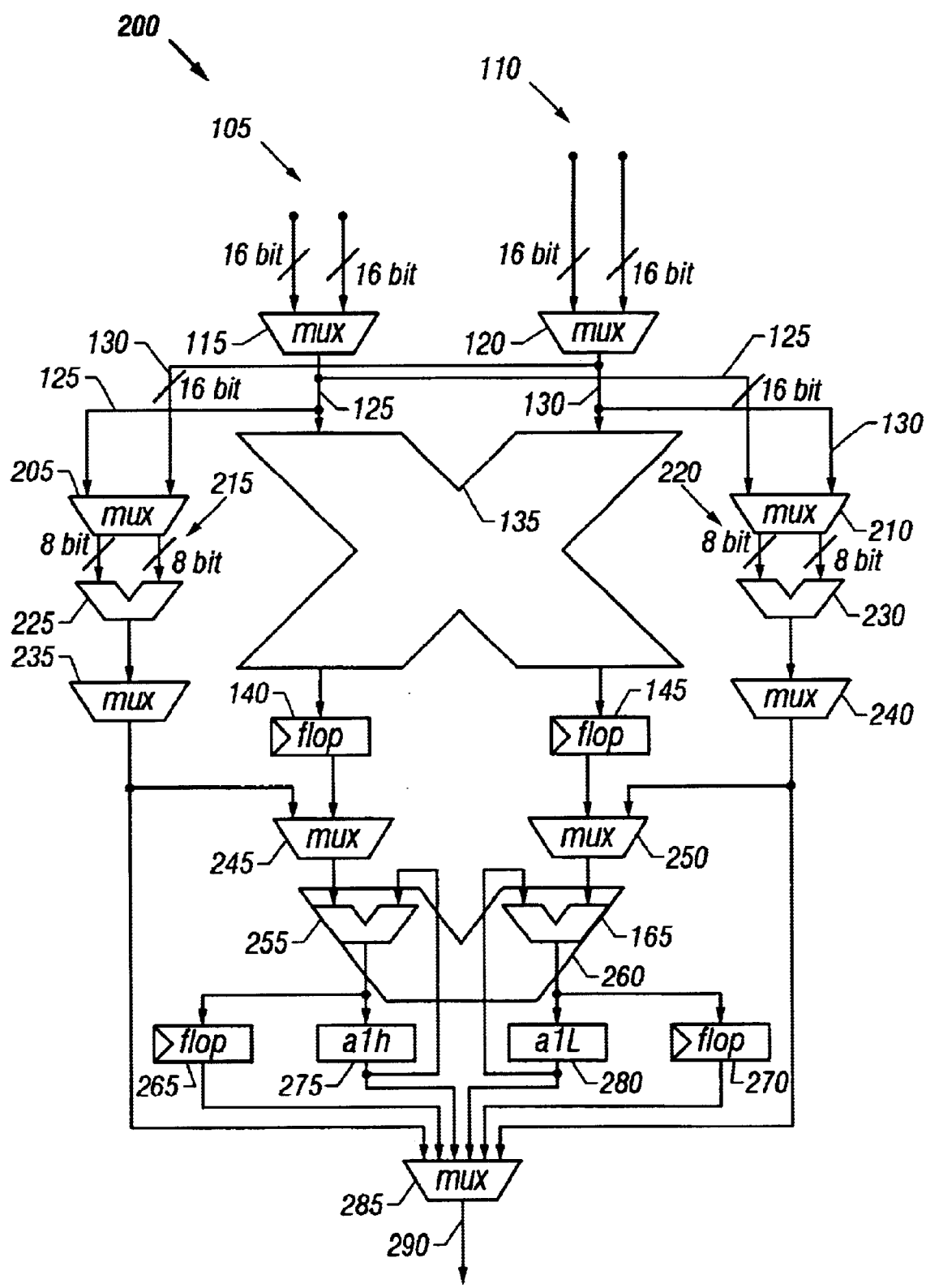
FIG. 2 a schematic of a digital signal processor for either n-bit or (n/2)-bit modes of operation according to an embodiment of the present invention.

FIG. 2 shows a schematic of a DSP 200 for either n-bit or (n/2)-bit modes of operation according to the present invention. The DSP 200 includes multiplexers 115, 120, 205, 210, 235, 240, 245, 250, 285, a multiplier 135, flops 140, 145, 265, 270, arithmetic logic units (ALUs) 225, 230, 255, 260, and accumulators 275, 280. The DSP 200 may be used for processing either n-bit data or (n/2)-bit data, with n equal to 16 for the exemplary DSP 200 illustrated in FIG. 2. Thus, the DSP 200 may operate efficiently in either an 8-bit mode or a 16-bit mode. It can be appreciated that the size of the data for which the DSP 200 operates is a matter of design choice and does not affect the scope of the present invention.

The DSP 200 receives data in the form of 16-bit data 105, 110 from data buses. Each data bus provides a plurality of 16-bit data sets 105, 110 to the DSP 200. The plurality of 16-bit data sets 105 is input into the multiplexer 115 and the plurality of 16-bit data sets is input into the multiplexer 120. The multiplexer 115 selects a single 16-bit data set 125 from the plurality of 16-bit data sets 105. The multiplexer 120 selects a single 16-bit data set 130 from the plurality of 16-bit data sets 110. The selected 16-bit data sets 125, 130 are processed by the DSP 200.

The DSP 200 may process the selected 16-bit data sets 125, 130 in either 8-bit mode or 16-bit mode. The DSP 200 includes multiplexers 205, 210, 235, 240 and ALUs 225, 230 which may operate in parallel with the multiplexer 135 and support the (n/2)-bit, or 8-bit, operation of the DSP 200. The multiplexers 205, 210 receive the selected 16-bit data sets 125, 130 from the multiplexers 115, 120. The multiplexer 10o 205 selects the appropriate 16-bit data from the input data 125, 130 and outputs 8-bit data 215. The multiplexer 210 also selects the appropriate 16-bit data sets from the input data 125, 130 and outputs 8-bit data 220. Of course, the original data from the data bus may have been 8-bit, in which case the 8-bit data is passed through the multiplexers 115, 120, 205, 210 to the ALUs 225, 230.

The ALUs 225, 230 receive the 8-bit data 215, 220 and perform basic arithmetic and logical operations as directed by the DSP 200. The results of these operations are then output to the multiplexers 235, 240. The multiplexers 235, 240 may then provide the data to either the multiplexers 245, 250 or directly to the multiplexer 285. The multiplexers 235, 240 also allow for the selection of both the sum and difference functions, thereby allowing for processing of an absolute value function.

The multiplier 135 may be used if n-bit processing is desired. As stated above, the multiplier 135 is designed to multiply two n-bit numbers and is therefore at least 2n bits in size. If the multiplier 135 multiplies numbers smaller than n bits, a portion of the multiplier 135 may remain unused and the DSP may not operate at desired efficiency. Therefore, if (n/2)-bit numbers or smaller need to be processed, the ALUs 225, 230 may be used. This increases the efficiency of the DSP 200.

The result of the multiplication operation is transferred to the flops 140, 145. The flops 140, 145 contain partial products from the multiplication process. The combination of the partial products in the flops 140, 145 equals the result of the multipliers 135. The flops 140, 145 pass the partial products to the multiplexers 245, 250. The multiplexers 235, 240 also pass the result of the mathematical operations from the ALUs 225, 230 to the multiplexers 245, 250. Depending on the operation mode of the DSP 200, the multiplexers 245, 250 select the appropriate data to pass to the ALUs 255, 260. Two (n/2)-bit ALUs 255, 260 are used in place of the one n-bit ALU in the 16-bit DSP 100 of FIG. 1. The ALU 255 takes the data from the multiplexer 245 and adds that result to the previous value of the accumulator 275. The ALU 260 takes the data from the multiplexer 250 and adds that result to the previous value of the accumulator 280.

The output of the ALU 255 may be provided to the flop 265 and to the accumulator 275. The flop 265 simply contains the result of the last value of the ALU 255. The accumulator 275 value represents a total of all of the previous results from the ALU 255. The most recent output of the ALU 255 may then be added to the accumulator 275. The new accumulator value is then provided in a feedback loop back to the ALU 255. The new accumulator value may also be provided as an input to the multiplexer 285. The value of the flop 265 may also be provided as an input to the multiplexer 285.

In a similar manner, the output of the ALU 260 may be provided to the flop 265 and to the accumulator 280. The flop 270 always contains the most recent value of the ALU 260. The accumulator 280 value represents a total of all of the previous results from the ALU 260. The most recent output of the ALU 260 may then be added to the accumulator 280. The new accumulator value may then be provided in a feedback loop back to the ALU 260. The new accumulator value may also be provided as an input to the multiplexer 285. The value of the flop 270 may also be provided as an input to the multiplexer 285.

The multiplexer 285 allows the DSP 200 to choose which value should be output by the DSP 200. Once selected, this data is sent to an output 290.

Figure 3:
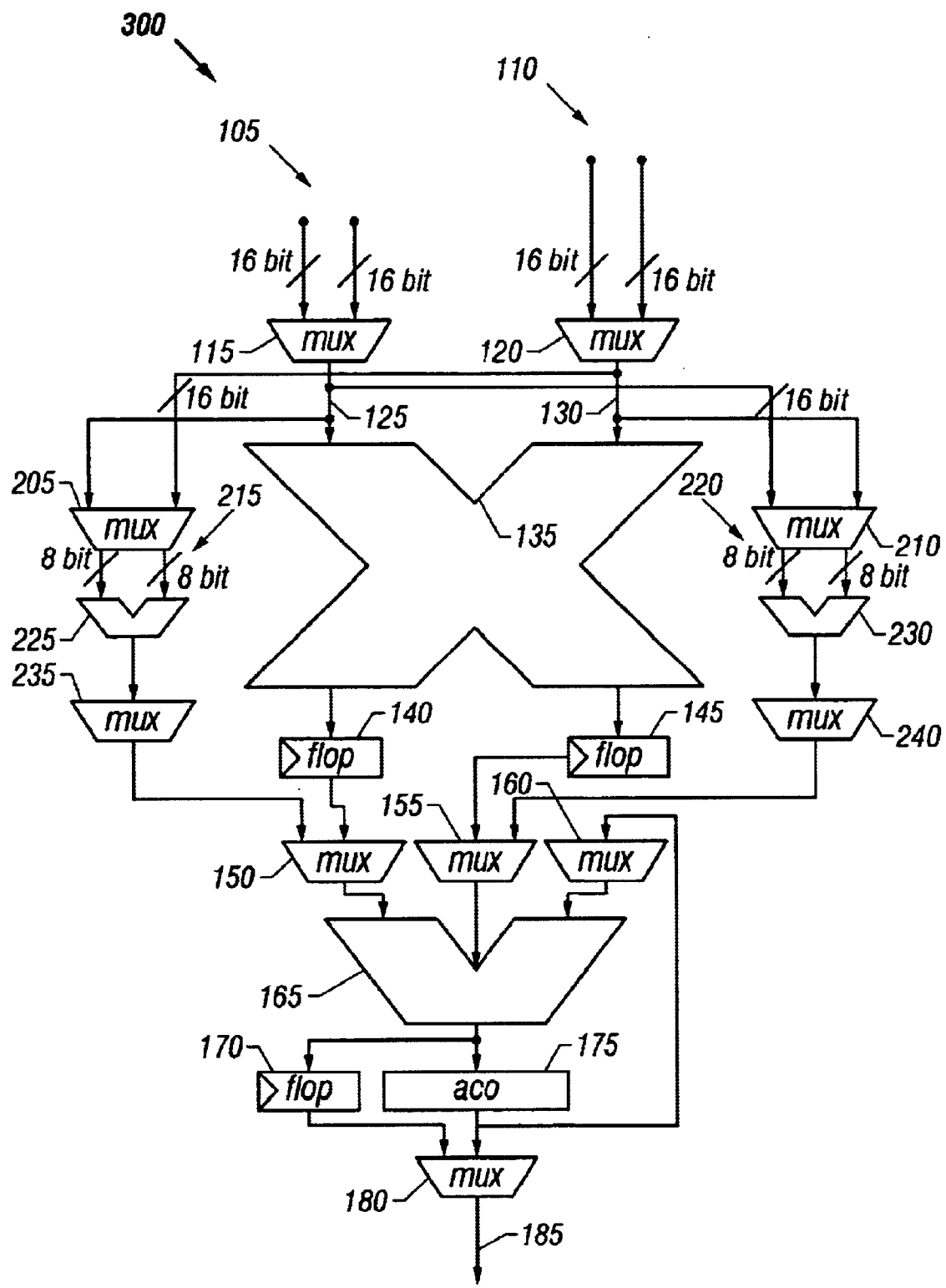
FIG. 3 is a schematic of a digital signal processor for either n-bit or (n/2)-bit modes of operation providing interpolation functions according to an embodiment of the present invention.

FIG. 3 is a schematic of a DSP 300 for either n-bit or (n/2)-bit modes of operation providing interpolation functions. The DSP 300 combines the n-bit or (n/2)-bit multiplication stage of the DSP 200 of FIG. 2 with the single ALU 165 of the DSP 100 of FIG. 1.

Figure 4:
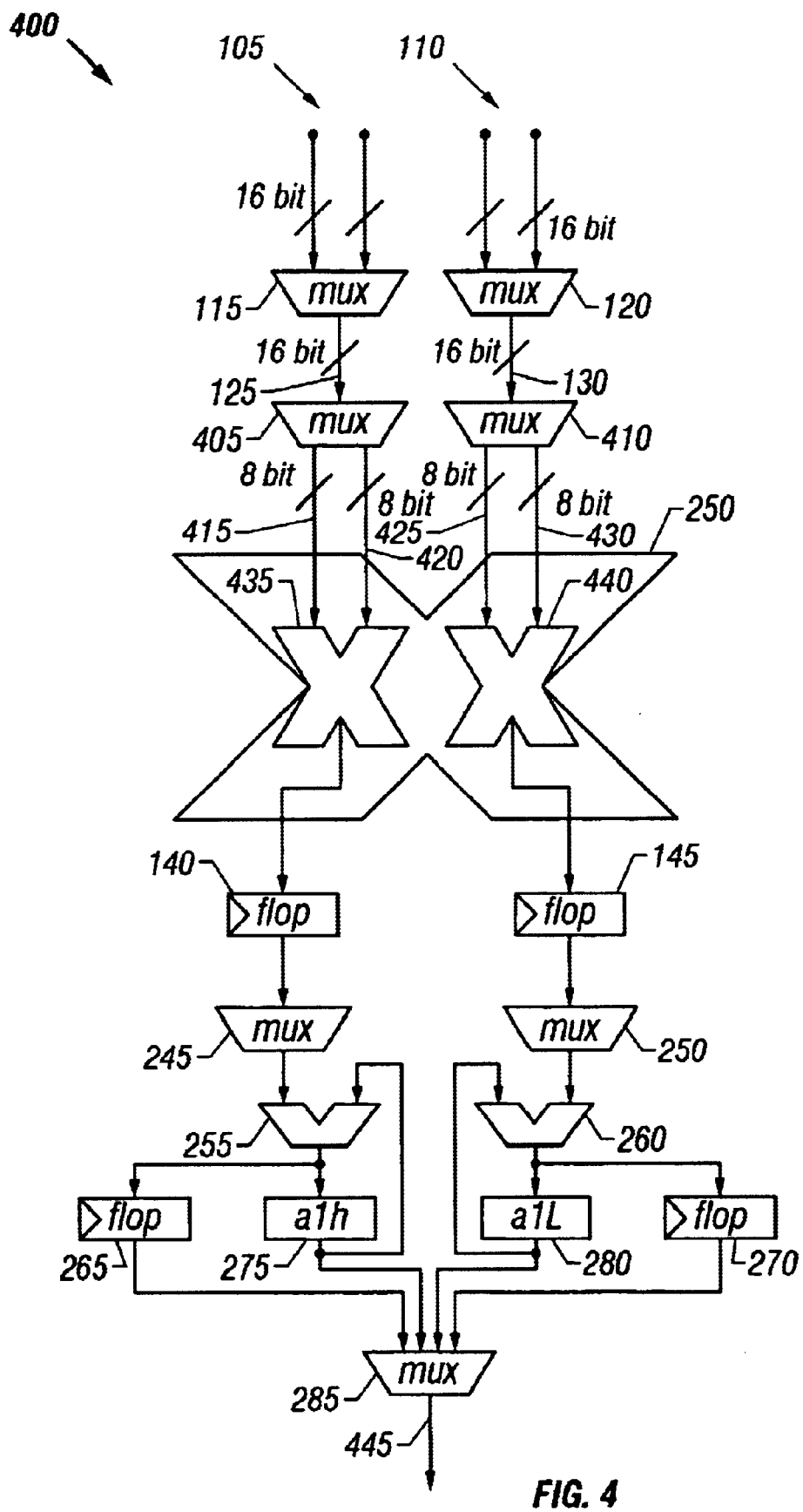
FIG. 4 a schematic of a digital signal processor including a split multiplier for (n/2)-bit operation according to an embodiment of the present invention.

FIG. 4 shows a schematic of a DSP 400 including a split multiplier for (n/2)-bit operation according to an embodiment of the present invention. The DSP 400 receives data in the form of 16-bit data sets 105, 110 from data buses (not shown). Each data bus provides a plurality of 16-bit data sets 105, 110 to the DSP 400. The plurality of 16-bit data sets 105 are input into the multiplexer 115 and the plurality of 16-bit data sets 110 are input into the multiplexer 120. The multiplexer 115 selects a single 16-bit data set 125 from the plurality of 16-bit data set 105. The multiplexer 120 selects a single 16-bit data set 130 from the plurality of 16-bit data set 110.

The multiplexer 405 receives the data 125 and outputs multiple 8-bit data strings 415, 420. The 8-bit data strings 415, 420 are received as inputs by the multiplier 435. The multiplexer 410 receives the data 130 and outputs multiple 8-bit data strings 425, 430. The 8-bit data strings 425, 430 are received as inputs by the multiplier 440. Of course, the original data from the data bus may have been 8-bit, in which case the 8-bit data is simply passed through the multiplexers 115, 120, 405, 410 to the multipliers 435, 440.

The multiplier 435 receives the selected 8-bit data 415, 420 from the multiplexer 405. The multiplier 440 receives the selected 8-bit data 425, 430 from the multiplexer 410. The multipliers 435, 440 are each designed to multiply two (n/2)-bit data strings. To ensure proper operation, the multipliers 435, 440 are at least n bits in size. The multipliers 435, 440 may be embodied using portions of the larger multiplier 135. While the larger multiplier 135 may be used to multiply numbers smaller than 16 bits, a portion of the multiplier 135 may remain unused and not operate at desired efficiency. By dividing the multiplier 135 into smaller components, or simply using two smaller multipliers 435, 440, (n/2)-bit data strings may be processed in a more efficient manner.

The results of the multiplication operations are transferred to the flops 140, 145. The flops 140, 145 pass the results to the multiplexers 245, 250. The remainder of the DSP 400 may operate as described above with reference to FIG. 2. The output 445 of the DSP 400 may be the result of the flop 265, the accumulator 275, the accumulator 280, or the flop 270.

Figure 5:
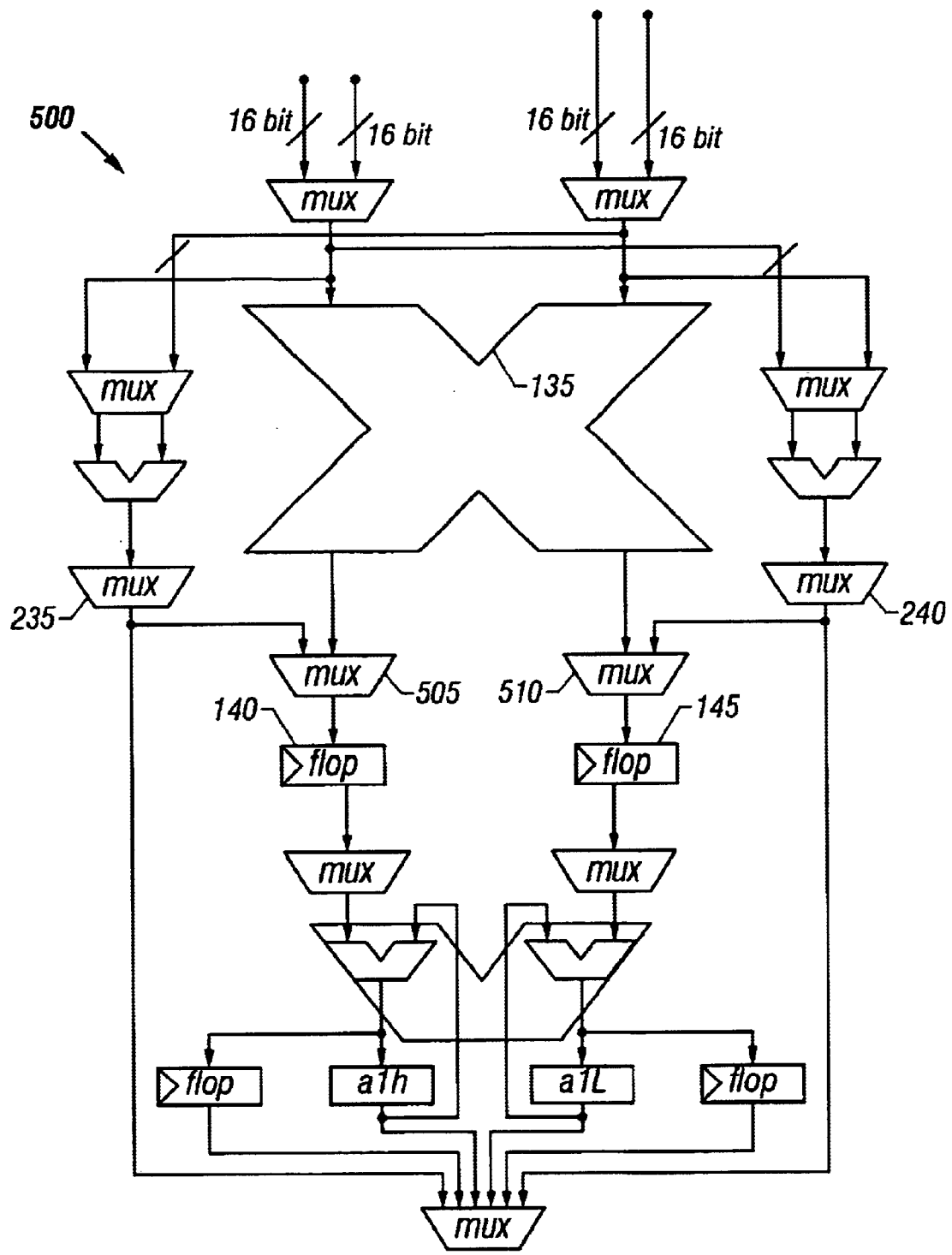
FIG. 5 a schematic of a digital signal processor for either n-bit or (n/2)-bit modes of operation according to an alternate embodiment of the present invention.

FIG. 5 a schematic of a digital signal processor for either n-bit or (n/2)-bit modes of operation according to an alternate embodiment of the present invention. The DSP 500 in FIG. 5 is a modified version of the DSP 200 of FIG. 2. In FIG. 5, a multiplexer 505 is placed between the multiplexer 235 and the flop 140. A second multiplexer 510 is placed between the multiplexer 240 and the flop 145. The multiplexers 505 and 510 allow selection of the input to provide to the flops 140, 145. The DSP 300 of FIG. 3 can be similarly modified.

The DSP according to an embodiment of the present invention may be used in place of an ASIC in devices requiring digital processing. Some examples include digital video cameras, computers, cellular telephones, and personal digital assistants. For example, the DSP of according to one embodiment of the invention may be used in a mobile video communicator with Internet access. The DSP may perform the calculations necessary to process the video data.

Numerous variations and modifications of the invention will become readily apparent to those skilled in the art. Accordingly, the invention may be embodied in other specific forms without departing from its spirit or essential characteristics. The detailed embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope. For example, while the disclosure describes division based on (n/2) data, the same techniques could be applied for any separation, e.g. (n/3), (n/4), etc. Generally, the division is into (n/m) parts.

What is claimed is:

1. An integrated circuit comprising:

a first processing path which processes data up to n-bits in an n-bit multiplier;

a second processing path operating in parallel with said first path, including a plurality of arithmetic logic units which processes different data than the data in said first processing path up to (n/2)-bits in parallel with said first processing path; and a first multiplexer which controls providing of n bit data to said n bit multiplier, and a second multiplexer separate from said first processing path which controls providing n/2 bit data to said second processing path.

2. The digital signal processor of claim 1, wherein the first processing path processes data up to 16 bits.

3. The digital signal processor of claim 2, wherein the second processing path processes data up to 8 bits.

4. The digital signal processor of claim 1, wherein data of (n/2)-bits or less is processed in the second processing path.

5. A method of processing data comprising:

determining a size of the data to be processed; and selecting a first processing path with an n-bit multiplier if the data size is greater than a first size;

selecting a second processing path with arithmetic logic units if the data size is less than the first size; and operating said first and second processing paths in parallel.

6. The method of claim 5, further comprising storing a result from the first processing path in a flop.

7. The method of claim 5, further comprising storing a result from the second processing path in a flop.

8. The method of claim 6, further comprising adding the result from the first processing path to a running total in at least one arithmetic logic unit.

9. The method of claim 7, further comprising adding the result from the second processing path to a running total in at least one arithmetic logic unit.

10. The method of claim 5, wherein the first processing path is used for approximately n-bit data and the second processing path is used for approximately (n/2)-bit data.

* * * * *